US008941806B2

(12) United States Patent
Jung et al.

(10) Patent No.: US 8,941,806 B2
(45) Date of Patent: Jan. 27, 2015

(54) LIQUID CRYSTAL DISPLAY

(75) Inventors: Kwang-Chul Jung, Seongnam-si (KR);
Se Hyoung Cho, Seoul (KR)

(73) Assignee: Samsung Display Co., Ltd. (KR)

( * ) Notice: Subject to any disclaimer, the term of this patent is extended or adjusted under 35 U.S.C. 154(b) by 134 days.

(21) Appl. No.: 13/419,853

(22) Filed: Mar. 14, 2012

(65) Prior Publication Data

US 2013/0077006 A1 Mar. 28, 2013

(30) Foreign Application Priority Data

Sep. 28, 2011 (KR) .......................... 10-2011-0098335

(51) Int. Cl.
| G02F 1/1343 | (2006.01) |
| G02F 1/1362 | (2006.01) |
| G02F 1/133 | (2006.01) |
| G02F 1/141 | (2006.01) |
| G09G 3/36 | (2006.01) |
| G02F 1/139 | (2006.01) |
| G02F 1/1337 | (2006.01) |
| G02F 1/137 | (2006.01) |

(52) U.S. Cl.
CPC ...... *G02F 1/13624* (2013.01); *G02F 1/134363* (2013.01); *G02F 2201/123* (2013.01); *G09G 3/3648* (2013.01); *G09G 2300/0434* (2013.01); *G09G 2300/0809* (2013.01); *G02F 1/1393* (2013.01); *G02F 2001/133742* (2013.01); *G02F 2001/134345* (2013.01); *G02F 2001/13706* (2013.01); *G02F 2201/40* (2013.01); *G02F 2203/30* (2013.01)
USPC ............... 349/144; 349/33; 349/37; 349/141; 349/143

(58) Field of Classification Search
CPC .............. G02F 1/134363; G02F 2001/134345; G02F 1/1368; G02F 1/13624
See application file for complete search history.

(56) References Cited

U.S. PATENT DOCUMENTS

| 5,483,366 | A | 1/1996 | Atherton | |
| 7,139,058 | B2 * | 11/2006 | Son et al. | ....................... 349/141 |
| 7,535,519 | B2 | 5/2009 | Lin | |
| 7,612,854 | B2 * | 11/2009 | Kang | ............................. 349/141 |
| 2009/0310047 | A1 * | 12/2009 | Shin et al. | ........................ 349/37 |
| 2012/0194774 | A1 * | 8/2012 | Jung et al. | ..................... 349/139 |

FOREIGN PATENT DOCUMENTS

| JP | 11161246 | 6/1999 |
| JP | 2004361942 | 12/2004 |
| JP | 4057961 | 12/2007 |

(Continued)

*Primary Examiner* — Bumsuk Won
*Assistant Examiner* — Angela Davison
(74) *Attorney, Agent, or Firm* — Cantor Colburn LLP

(57) ABSTRACT

A liquid crystal display includes a gate line, data lines transmitting a first voltage; a transmitting line transmitting a second voltage; and pixels including first and second pixel electrodes. One pixel electrode receives the first voltage through a data line, and the other receives the second voltage through the transmitting line. Branch electrodes of the pixel electrodes alternate, and a stem of the first pixel electrode of a first pixel, faces a stem of the first pixel electrode of a second pixel and a stem of the second pixel electrode of the second pixel, with respect to the data line. Areas of the stem of the first pixel electrode of the second pixel facing the stem of the first pixel electrode of the first pixel, and of the stem of the second pixel electrode of the second pixel facing the stem of the first pixel, are the same.

22 Claims, 8 Drawing Sheets

(56) References Cited

FOREIGN PATENT DOCUMENTS

| | | |
|---|---|---|
| JP | 2009168898 | 7/2009 |
| KR | 1020030033241 | 5/2003 |
| KR | 1020070037011 | 4/2007 |
| KR | 1020070080470 | 8/2007 |
| KR | 1020070102125 | 10/2007 |
| KR | 1020080077733 | 8/2008 |
| KR | 1020090130610 | 12/2009 |
| KR | 1020100055696 | 5/2010 |
| KR | 100993823 | 11/2010 |

\* cited by examiner

LIQUID CRYSTAL DISPLAY

This application claims priority to Korean Patent Application No. 10-2011-0098335 filed on Sep. 28, 2011, and all the benefits accruing therefrom under 35 U.S.C. §119, the entire contents of which are incorporated herein by reference.

BACKGROUND OF THE INVENTION (1) Field of the Invention

The invention relates to a liquid crystal display.

(2) Description of the Related Art

A liquid crystal display (hereinafter referred to as an "LCD") is one of the most widely used flat panel displays. The LCD includes two display panels provided with electric field generating electrodes, such as pixel electrodes and a common electrode, and a liquid crystal layer interposed between the two display panels. In the LCD, voltages are applied to the electric field generating electrodes to generate an electric field in the liquid crystal layer. Due to the generated electric field, liquid crystal molecules of the liquid crystal layer are aligned and polarization of incident light is controlled, thereby displaying images.

Also, to improve the display quality of the liquid crystal display, it is necessary to realize a liquid crystal display having a high contrast ratio, excellent viewing angle and fast response speed.

Also, when the pixel electrode and the signal line overlap each other to increase the aperture ratio of the liquid crystal display, a parasitic capacitance between signal lines and the pixel electrode is increased such that display quality may be deteriorated by crosstalk.

BRIEF SUMMARY OF THE INVENTION

The invention provides a liquid crystal display that is capable of simultaneously obtaining a high contrast ratio and a wide viewing angle of the liquid crystal display, increasing response speed of liquid crystal molecules, and simultaneously reducing or effectively preventing crosstalk due to an increase of parasitic capacitance between a signal line and a pixel electrode and crosstalk according to coupling between neighboring pixels while having a high aperture ratio, thereby representing good display characteristics.

A liquid crystal display according to an exemplary embodiment of the invention includes: a first substrate and a second substrate facing each other; a liquid crystal layer interposed between the first and second substrates and including liquid crystal molecules; a gate line on the first substrate and transmitting a gate signal; a plurality of data lines on the first substrate and transmitting a first voltage; a voltage transmitting line on the first substrate and transmitting a second voltage; and a plurality of pixels disposed on the first substrate and including a first pixel electrode and a second pixel electrode separated from each other. The plurality of pixels include: a first pixel and a second pixel neighboring each other with respect to a first data line; one of the first pixel electrode and the second pixel electrode is applied with a first voltage through one data line and the other of the first pixel electrode and the second pixel electrode is applied with a second voltage through the voltage transmitting line; the first pixel electrode and the second pixel electrode include a stem and a plurality of branch electrodes extended from the stem; the branch electrodes of the first pixel electrode and the branch electrodes of the second pixel electrode are alternately disposed; the stem of the first pixel electrode of the first pixel, faces the stem of the first pixel electrode of the second pixel and the stem of the second pixel electrode, with respect to the first data line; and the corresponding area of the stem of the first pixel electrode of the second pixel facing the stem of the first pixel electrode of the first pixel, and the corresponding area of the stem of the second pixel electrode of the second pixel facing the stem of the first pixel electrode of the first pixel, are substantially the same.

The stem of the second pixel electrode of the first pixel, may face the stem of the first pixel electrode of the second pixel and the stem of the second pixel electrode, with respect to the first data line; and the corresponding area of the stem of the first pixel electrode of the second pixel facing the stem of the second pixel electrode of the first pixel and the corresponding area of the stem of the second pixel electrode of the second pixel facing the stem of the second pixel electrode of the first pixel, may be substantially the same.

The voltage transmitting line may be disposed one per three pixels of the plurality of pixels.

The stem of the first pixel electrode and the second pixel electrode may cover at least ⅔ of the area of the voltage transmitting line.

A first interval between the branches of the first pixel electrode and the branches of the second pixel electrode is larger than a second interval between the branches of the first pixel electrode and the branches of the second pixel electrode. A first region includes the first interval between the branches of the first pixel electrode and the branches of the second pixel electrode, and a second region includes the second interval between the branches of the first pixel electrode and the branches of the second pixel electrode. The first region may be disposed at a region where the stems of the first pixel electrode and the second pixel electrode are not disposed, among the edge of the pixel area.

The liquid crystal layer may be vertically aligned when the electric field is not generated to the liquid crystal layer.

The first region may further include an extension including a third interval between the branches of the first pixel electrode and the branches of the second pixel electrode larger than the first interval.

A liquid crystal display according to an exemplary embodiment of the invention controls the arrangement and shape of a first pixel electrode and a second pixel electrode that are applied with voltages having different polarities and are alternately disposed, and thereby a high contrast ratio and a wide viewing angle of the liquid crystal display may be simultaneously ensured, and the response speed of the liquid crystal molecule may be fast and crosstalk according to an increase of the parasitic capacitance between the signal lines and the pixel electrode and crosstalk according to coupling between the neighboring pixels may be reduced or effectively prevented.

BRIEF DESCRIPTION OF THE DRAWINGS

The above and other features of this disclosure will become more apparent by describing in further detail exemplary embodiments thereof with reference to the accompanying drawings, in which.

DETAILED DESCRIPTION OF THE INVENTION

Figure 1:
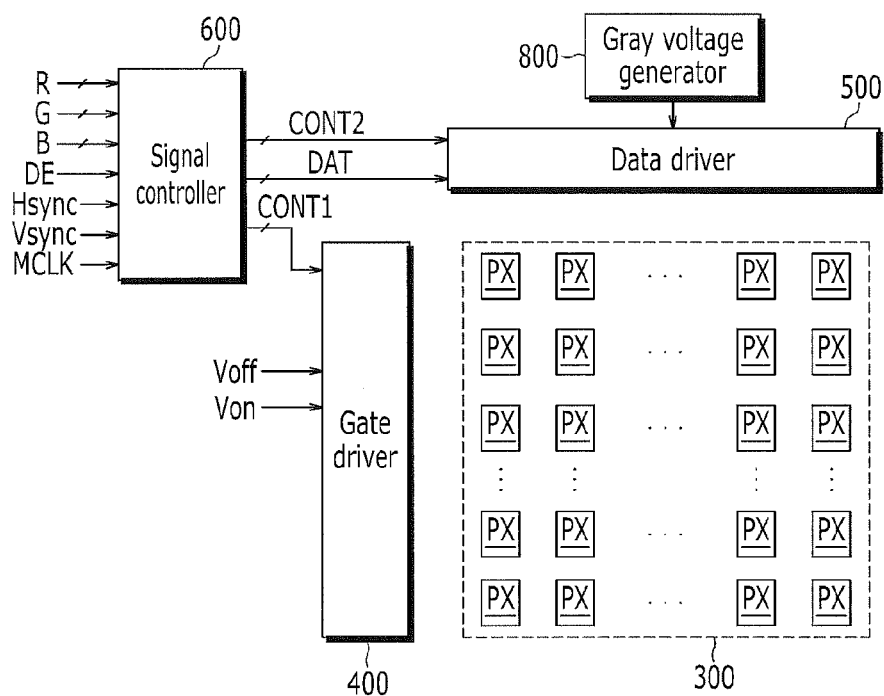
FIG. 1 is a block diagram of an exemplary embodiment of a liquid crystal display according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present. As used herein, "connected" includes physically and/or electrically connected. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "below," "lower," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "lower" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, an exemplary embodiment of a liquid crystal display according to the invention will be described in detail with reference to the accompanying drawings.

Firstly, an exemplary embodiment of a liquid crystal display according to the invention will be described with reference to FIG. 1 to FIG. 3. FIG. 1 is a block diagram of an exemplary embodiment of a liquid crystal display according to the invention, FIG. 2 is an equivalent circuit diagram showing an exemplary embodiment of a structure of the liquid crystal display and one pixel according to the invention, and FIG. 3 is an exemplary embodiment of an equivalent circuit diagram of a plurality of adjacent pixels of the liquid crystal display according to the invention.

Referring to FIG. 1, an exemplary embodiment of a liquid crystal display according to the invention includes a liquid crystal panel assembly 300, a gate driver 400, a data driver 500, a gray voltage generator 800 and a signal controller 600.

Figure 2:
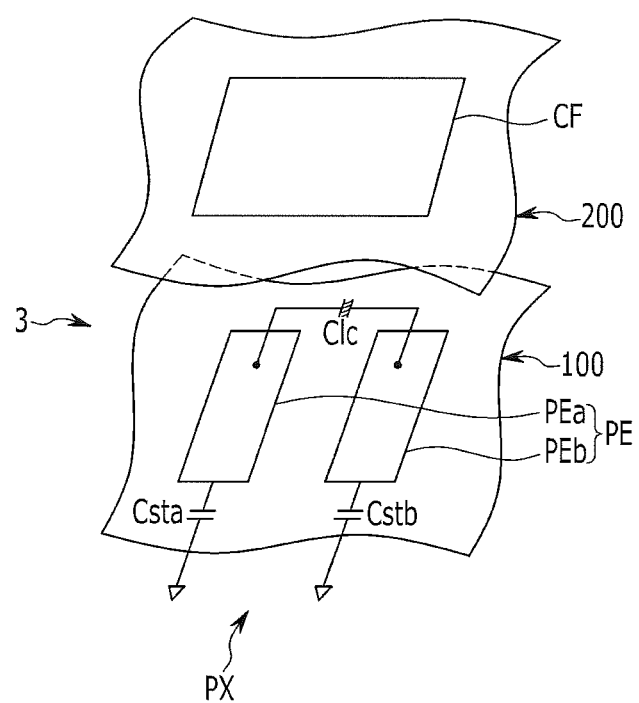
FIG. 2 is an equivalent circuit diagram showing an exemplary embodiment of a structure of one pixel in the liquid crystal display according to the invention.
Figure 3:
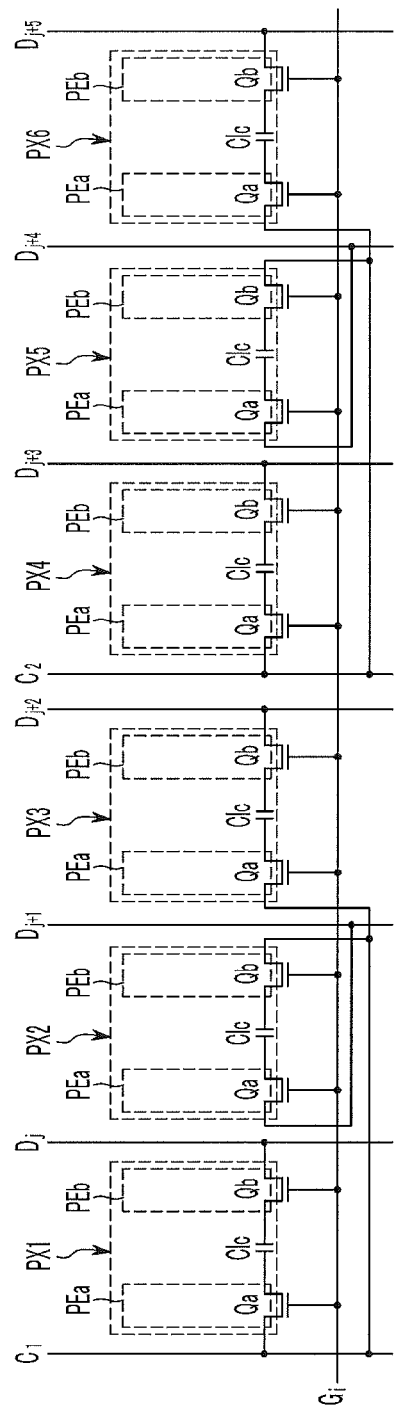
FIG. 3 is an equivalent circuit diagram of an exemplary embodiment of a plurality of adjacent pixels of the liquid crystal display according to the invention.

Referring to FIG. 2, the liquid crystal panel assembly 300 includes lower and upper panels 100 and 200 facing each other, and a liquid crystal layer 3 interposed therebetween.

The liquid crystal capacitor Clc adopts a first pixel electrode PEa and a second pixel electrode PEb of the lower panel 100 as two terminals, and the liquid crystal layer 3 between the first and second pixel electrodes PEa and PEb serves as a dielectric material. The first pixel electrode PEa is connected to a first switching element (not shown) and the second pixel electrode PEb is connected to a second switching element (not shown).

The liquid crystal layer 3 has dielectric anisotropy, and liquid crystal molecules 31 (see FIG. 4) of the liquid crystal layer 3 may be arranged such that their long axes are aligned substantially perpendicular to surfaces of the two panels 100 and 200 in the absence of an electric field.

The first pixel electrode PEa and the second pixel electrode PEb may be on different layers or on the same layer. First and second storage capacitors (not shown) serving as assistants of the liquid crystal capacitor Clc may be formed by superimposing separate electrodes (not shown) provided on the lower panel 100 while being interposed between the first and second pixel electrodes PEa and PEb, and insulators. Although not shown, another exemplary embodiment of a liquid crystal display according to the invention may include an additional electrode in the upper panel 200 and applied with a predetermined voltage of a constant magnitude, and the additional electrode may be transparent.

In order to realize color display, each pixel PX uniquely displays one of primary colors (spatial division), or each pixel PX temporally and alternately displays primary colors (temporal division). Then, the primary colors are spatially or temporally synthesized, and thus a desired color is recognized. The primary colors may include three primary colors of red, green, and blue. Also, each pixel PX may display a white color as well as three primary colors of red, green, and blue. One exemplary embodiment of the spatial division is represented in FIG. 2, where each pixel PX is provide with a color filter CF indicating one of the primary colors on the region of the upper panel 200 corresponding to the first and second pixel electrodes PEa and PEb. Unlike FIG. 2, the color filter CF may be on or below the first and second pixel electrodes PEa and PEb in the lower panel 100.

Referring to FIG. 1 and FIG. 3, in a view of an equivalent circuit, the liquid crystal panel assembly 300 includes a plurality of signal lines Gi, C1, C2, Dj, Dj+1, Dj+2, Dj+3, Dj+4, and Dj+5, and a plurality of pixels PX connected thereto and arranged in an approximate matrix format. In the structure shown in FIG. 2, the liquid crystal panel assembly 300 includes the lower panel 100 and the upper panel 200 facing each other, and the liquid crystal layer 3 interposed therebetween.

The signal lines Gi, C1, C2 Dj, Dj+1, and Dj+2 include a plurality of gate lines Gi transmitting gate signals (referring to as "scanning signals"), a plurality of data lines Dj, Dj+1, Dj+2, Dj+3, Dj+4, and Dj+5 transmitting data voltages, a first voltage transmitting line C1 transmitting a first voltage, and a second voltage transmitting line C2 transmitting a second voltage. The gate lines Gi longitudinally extend in an approximate row direction and are parallel to each other, and the data lines Dj, Dj+1, Dj+2, Dj+3, Dj+4, and Dj+5, the first voltage transmitting line C1, and the second voltage transmitting line C2 longitudinally extend in an approximate column direction and are parallel to each other.

A plurality of pixels PX include a first pixel PX1, a second pixel PX2, a third pixel PX3, a fourth pixel PX4, a fifth pixel PX5, and a sixth pixel PX6 that are sequentially disposed in a pixel row direction.

Among three neighboring pixels PX1, PX2, and PX3, the first pixel PX1 includes a first switching element Qa and a second switching element Qb connected to the signal lines Gi, C1, and Dj and the liquid crystal capacitor Clc connected thereto, the second pixel PX2 includes a first switching element Qa and a second switching element Qb connected to the signal lines G1, C1, and Dj+1 and the liquid crystal capacitor Clc connected thereto, and the third pixel PX3 includes a first switching element Qa and a second switching element Qb connected to the signal lines G1, C1, and Dj+2 and the liquid crystal capacitor Clc connected thereto.

The first switching element Qa and the second switching element Qb of the three neighboring pixels pixel PX1, PX2, and PX3 as three terminal elements such as thin film transistors provided in the lower panel 100 include a control terminal connected to the gate line Gi, an input terminal connected to the first voltage transmitting line C1 or the data lines Dj, Dj+1, and Dj+2, and an output terminal connected to the liquid crystal capacitor Clc.

Among three neighboring pixels PX4, PX5, and PX6, the fourth pixel PX4 includes a first switching element Qa and a second switching element Qb connected to the signal lines G1, C2, and Dj+3 and the liquid crystal capacitor Clc connected thereto, the fifth pixel PX5 includes a first switching element Qa and a second switching element Qb connected to the signal lines G1, C2, and Dj+4 and the liquid crystal capacitor Clc connected thereto, and the sixth pixel PX6 includes a first switching element Qa and a second switching element Qb connected to the signal lines G1, C2, and Dj+5 and the liquid crystal capacitor Clc connected thereto.

The first switching element Qa and the second switching element Qb of the three neighboring pixels pixel PX4, PX5, and PX6 as three terminal elements such as thin film transistors provided in the lower panel 100 include a control terminal connected to the gate line Gi, an input terminal connected to the second voltage transmitting line C2 or the data lines Dj+3, Dj+4, and Dj+5, and an output terminal connected to the liquid crystal capacitor Clc.

Next, an exemplary embodiment of a driving method of a liquid crystal display according to the invention will be described with reference to FIG. 2 and FIG. 3 as well as FIG. 4.

Figure 4:
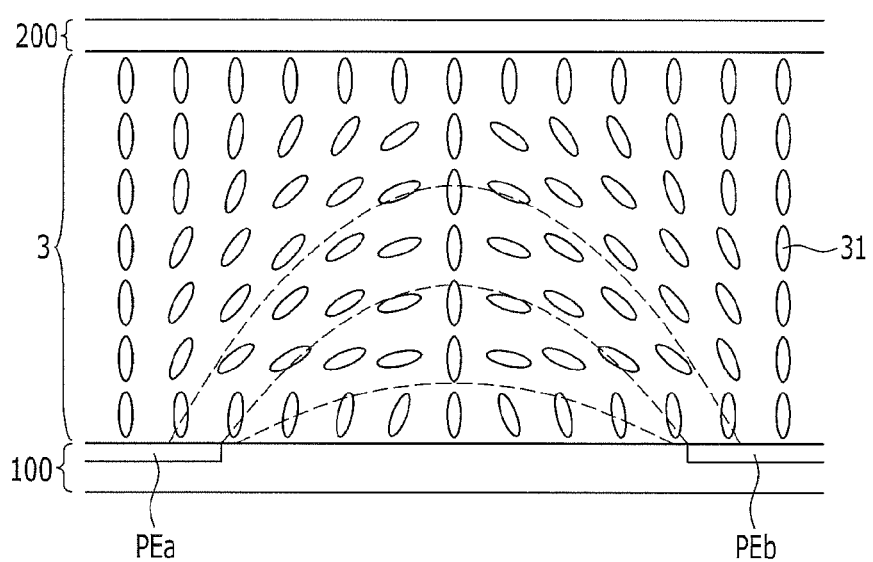
FIG. 4 is a cross-sectional view of an exemplary embodiment of a liquid crystal display according to the invention.

FIG. 4 is a cross-sectional view of an exemplary embodiment of a liquid crystal display according to the invention.

Referring to FIG. 2 and FIG. 3, if the first voltage transmitting line C1 is applied with the first voltage and the data lines Dj, Dj+1, and Dj+2 are applied with the data voltage, the data voltage is applied to the corresponding pixels PX1, PX2, and PX3 through the turned-on first switching element Qa and second switching element Qb. In detail, the first pixel electrode PEa of the first pixel PX1 is applied with the first voltage flowing in the first voltage transmitting line C1 through the first switching element Qa, and the second pixel electrode PEb is applied with the data voltage flowing in the first data line Dj through the second switching element Qb. Also, the first pixel electrode PEa of the second pixel PX2 is applied with the data voltage flowing in the second data line Dj+1 through the first switching element Qa, and the second pixel electrode PEb is applied with the first voltage flowing in the first voltage transmitting line C1 through the second switching element Qb. Also, the first pixel electrode PEa of the third pixel PX3 is applied with the first voltage flowing in the first voltage transmitting line Cj through the first switching element Qa, and the second pixel electrode PEb is applied with the data voltage flowing in the third data line Dj+2 through the second switching element Qb.

Also, if the second voltage transmitting line C2 is applied with the second voltage and the data lines Dj+3, Dj+4, and Dj+5 are applied with the data voltage, the data voltage is applied to the corresponding pixels PX4, PX5, and PX6 through the turned-on first switching element Qa and second switching element Qb. In detail, the first pixel electrode PEa of the fourth pixel PX4 is applied with the second voltage flowing in the second voltage transmitting line C2 through the first switching element Qa, and the second pixel electrode PEb is applied with the data voltage flowing in the fourth data line Dj+3 through the second switching element Qb. Also, the first pixel electrode PEa of the fifth pixel PX5 is applied with the data voltage flowing in the fifth data line Dj+4 through the first switching element Qa, and the second pixel electrode PEb is applied with the second voltage flowing in the second voltage transmitting line C2 through the second switching element Qb. Further, the first pixel electrode PEa of the sixth pixel PX6 is applied with the second voltage flowing in the second voltage transmitting line C2 through the first switching element Qa, and the second pixel electrode PEb is applied with the data voltage flowing in the sixth data line Dj+5 through the second switching element Qb.

Here, the voltage applied to the first pixel electrode PEa and the second pixel electrode PEb of the pixels PX1, PX2, PX3, PX4, PX5, and PX6 are voltages corresponding to luminance for displaying by the pixel PX.

The first voltage flowing in the first voltage transmitting line C1 and the second voltage flowing in the second voltage transmitting line C2 may have opposite polarities with respect to a reference voltage. In one exemplary embodiment, for example, when a minimum voltage of the liquid crystal display is 0 volt (V) and a maximum voltage is 14 volts (V), the reference voltage Vref may be about 7V, the voltage flowing in the first voltage line C1 may be about 0V or about 14V, and the voltage flowing in the second voltage line C2 may be about 14V or about 0V. Also, the polarities of the first voltage flowing in the first voltage line C1 and the second voltage flowing in the second voltage line C2 may be changed per frame.

The difference between the two voltages applied to the first and second pixel electrodes PEa and PEb is expressed as a charged voltage of the liquid crystal capacitors Clc, e.g., a pixel voltage. If a potential difference is generated between the two terminals of the liquid crystal capacitor Clc, as shown in FIG. 4, an electric field substantially parallel to the surface of the display panels 100 and 200 is formed in the liquid crystal layer 3 between the first and second pixel electrodes PEa and PEb. When the liquid crystal molecules 31 have positive dielectric anisotropy, the liquid crystal molecules 31 are arranged such that the long axes thereof are aligned parallel to the direction of the electric field, and the degree of inclination is changed according to the magnitude of the pixel voltage. This liquid crystal layer 3 is referred to as an electrically-induced optical compensation ("EOC") mode liquid crystal layer. Also, the change degree of the polarization of light passing through the liquid crystal layer 3 is changed according to the inclination degree of the liquid crystal molecules 31. The change of the polarization appears as a change of transmittance of the light by the polarizer, and accordingly, the pixel PX displays the desired predetermined luminance.

Figure 5:
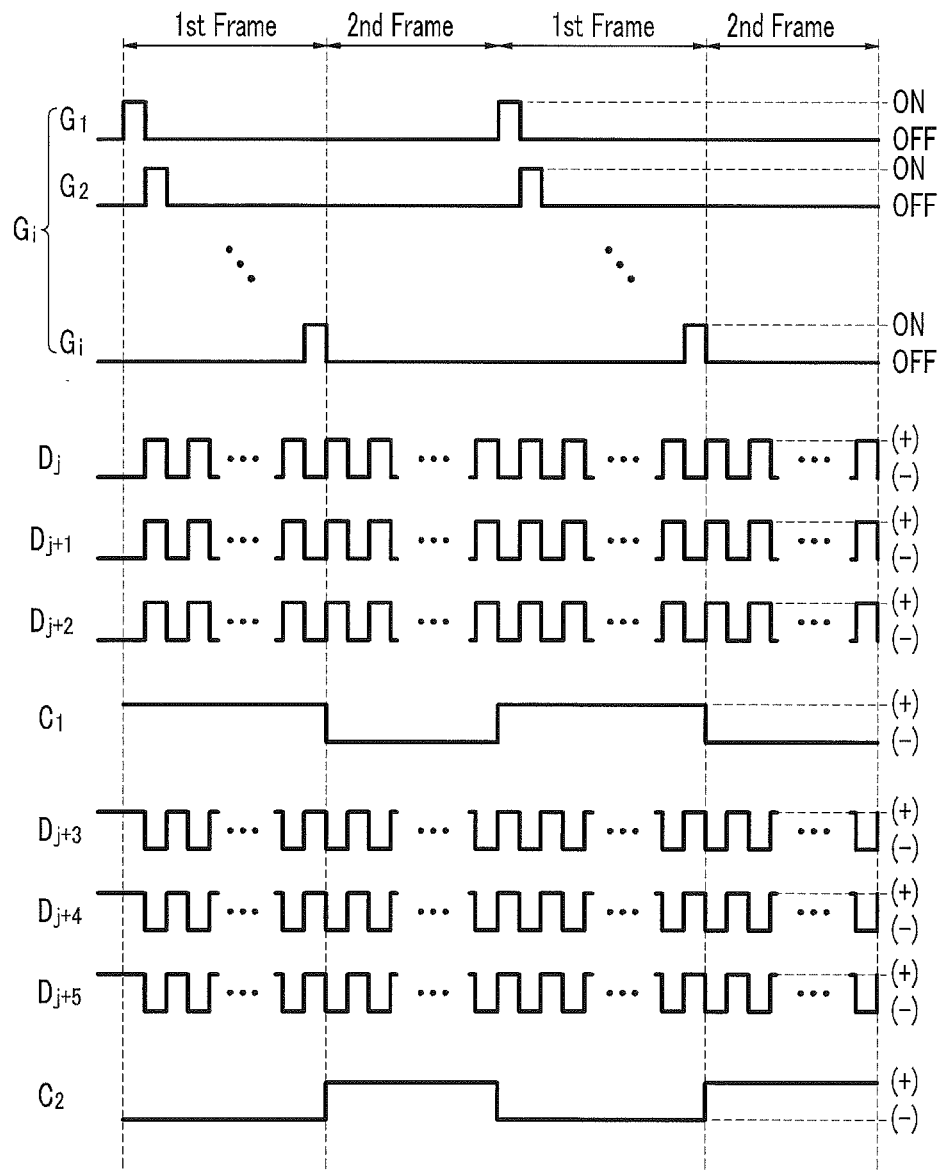
FIG. 5 is a waveform diagram of signals applied to a pixel of a liquid crystal display shown in FIG. 3.

Next, another exemplary embodiment of a driving method of a liquid crystal display according to the invention will be described with reference to FIG. 3 and FIG. 5. FIG. 5 is a waveform diagram of a signal applied to a pixel of the liquid crystal display shown in FIG. 3.

Firstly, a driving method during the first frame will be described. If the gate line Gi is sequentially applied with the gate-on voltage, the first pixel electrode PEa of the first pixel PX1 is applied with the first voltage flowing in the first voltage transmitting line C1 through the turned-on first switching element Qa, the second pixel electrode PEb of the first pixel PX1 is applied with the data voltage flowing in the first data line Dj through the turned-on second switching element Qb, the first pixel electrode PEa of the second pixel PX2 is applied with the data voltage flowing in the second data line Dj+1 through the turned-on first switching element Qa, and the second pixel electrode PEb of the second pixel PX2 is applied with the first voltage flowing in the first voltage transmitting line C1 through the turned-on second switching element Qb. Also, the first pixel electrode PEa of the third pixel PX3 is applied with the first voltage flowing in the first voltage transmitting line C1 through the turned-on first switching element Qa, and the second pixel electrode PEb of the third pixel PX3 is applied with the data voltage flowing in the third data line Dj+2 through the turned-on second switching element Qb.

Similarly, the first pixel electrode PEa of the fourth pixel PX4 is applied with the second voltage flowing in the second voltage transmitting line C2 through the turned-on first switching element Qa, and the second pixel electrode PEb of the fourth pixel PX4 is applied with the data voltage flowing in the fourth data line Dj+3 through the turned-on second switching element Qb. Also, the first pixel electrode PEa of the fifth pixel PX5 is applied with the data voltage flowing in the fifth data line Dj+4 through turned-on first switching element Qa, and the second pixel electrode PEb of the fifth pixel PX5 is applied with the second voltage flowing in the second voltage transmitting line C2 through the turned-on second switching element Qb. Further, the first pixel electrode PEa of the sixth pixel PX6 is applied with the second voltage flowing in the second voltage transmitting line C2 through the turned-on first switching element Qa, and the second pixel electrode PEb of the sixth pixel PX6 is applied with the data voltage flowing in the sixth data line Dj+5 through the turned-on second switching element Qb.

Here, the polarity of the first voltage flowing in the first voltage transmitting line C1 may be positive (+), and the polarity of the second voltage flowing in the second voltage transmitting line C2 may be negative (−). Accordingly, during the first frame, the polarity of the first pixel PX, the second pixel PX2, and the third pixel PX3 is positive (+), and the polarity of the fourth pixel PX4, the fifth pixel PX5, and the sixth pixel PX6 is negative (−).

However, in a case of another exemplary embodiment of the invention, the polarity of the first voltage applied to the first voltage transmitting line C1 may be negative (−), and the polarity of the second voltage applied to the second voltage line C2 may be positive (+).

These steps are repeated for the pixel rows connected to the gate lines, and thereby the first frame is completed. If the first frame is completed, the second frame is started.

If the second frame is started, the gate-on voltage is sequentially applied to the gate line Gi, and the signal is applied to each pixel like in the first frame. However, during the second frame, the polarities of the first voltage flowing in the first voltage transmitting line C1 and the second voltage flowing in the second voltage transmitting line C2 are opposite to those of the first frame. Accordingly, the polarity of each pixel PX is opposite to that of the first frame. In detail, during the second frame, the polarity of the first pixel PX, the second pixel PX2, and the third pixel PX3 is negative (−), and the polarity of the fourth pixel PX4, the fifth pixel PX5, and the sixth pixel PX6 is positive (+).

However, in a case of another exemplary embodiment of the invention, the polarity of the first voltage applied to the first voltage transmitting line C1 during the second frame may be positive (+), and the polarity of the second voltage applied to the second voltage line C2 may be negative (−).

The first frame and the second frame are repeated such that the desired pixel voltage is applied for each pixel during the desired frame.

In general, in an exemplary embodiment of the invention, one pixel is connected to one gate line and two different data lines to charge the desired voltage to the liquid crystal capacitor Clc by dividing one pixel into two pixel electrodes PEa and PEb and applying the different voltages through the different switching elements. That is, the first and second switching elements connected to the first and second pixel electrodes of each pixel are connected to the same gate line but are connected the different data lines, thereby receiving the data voltage through the different data lines.

However, an exemplary embodiment of one pixel of the liquid crystal display according to the invention is connected to one gate line, one data line, and a first voltage transmitting line or a second voltage transmitting line. Accordingly, the number of data lines is reduced, and thereby the cost of the driver of the liquid crystal display may be reduced. According to the exemplary embodiment of the arrangement of the signal lines and the pixels of the liquid crystal display according to the invention, two voltage transmitting lines are added compared with the general arrangement of the signal lines and the pixels. However, the voltage transmitting lines are applied with the voltage that has the constant value during one frame and has the polarity that is changed for the frames such that a simple driver to apply the voltage having the constant value and the polarity that is changed for the frames is added, and accordingly the driving method is simple and the manufacturing cost is low.

Figure 6:
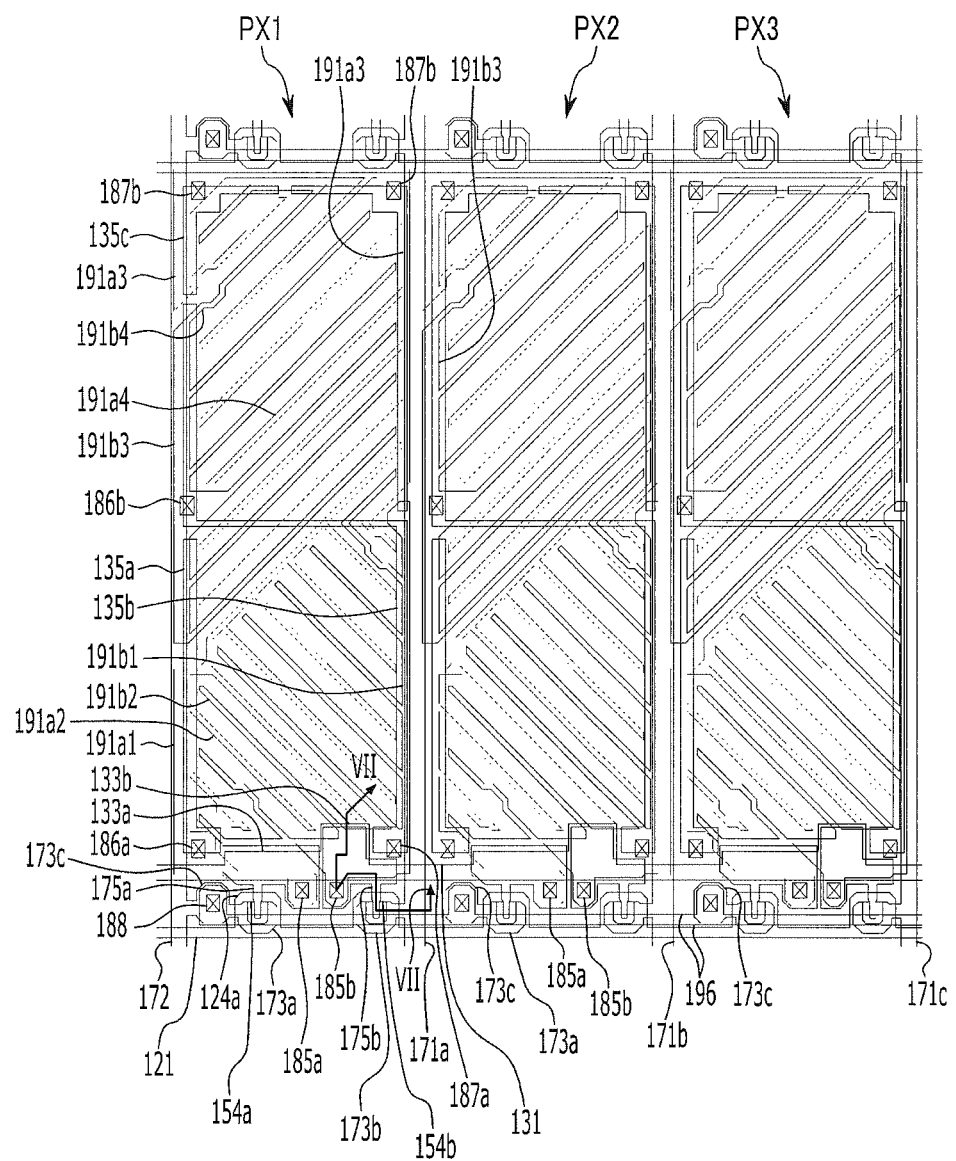
FIG. 6 is a plan view of an exemplary embodiment of a liquid crystal display according to the invention.

Next, an exemplary embodiment of the above-described liquid crystal display will be described with reference to FIG. 6 to FIG. 8. FIG. 6 is a plan view of an exemplary embodiment of a liquid crystal display according to the invention, FIG. 7 is a cross-sectional view of the liquid crystal panel assembly FIG. 6 taken along line VII-VII, and FIG. 8 is a plan view of an exemplary embodiment of a pixel electrode of the liquid crystal display of FIG. 6.

Figure 7:
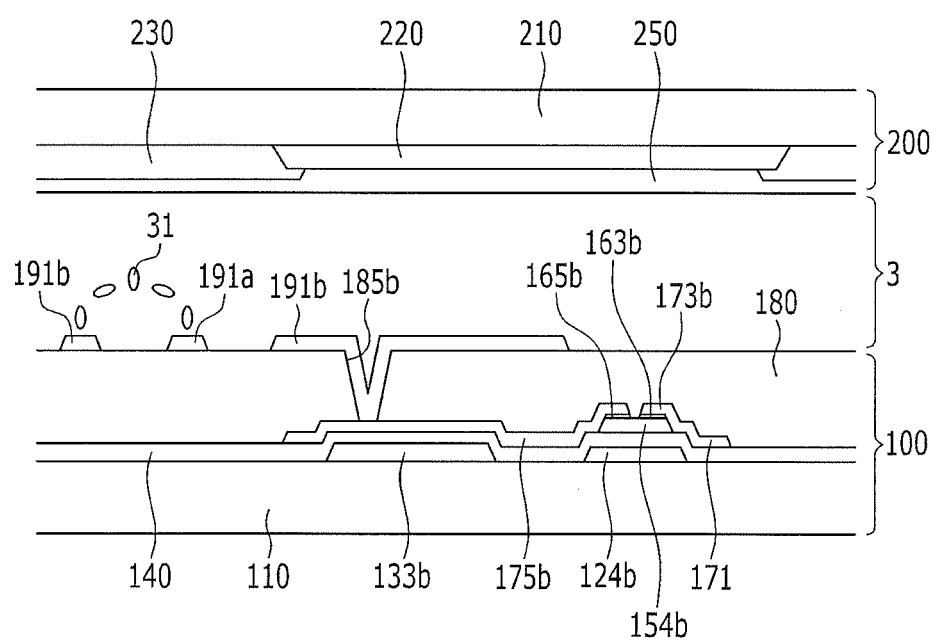
FIG. 7 is a cross-sectional view of the liquid crystal panel assembly of FIG. 6 taken along line VII-VII.
Figure 8:
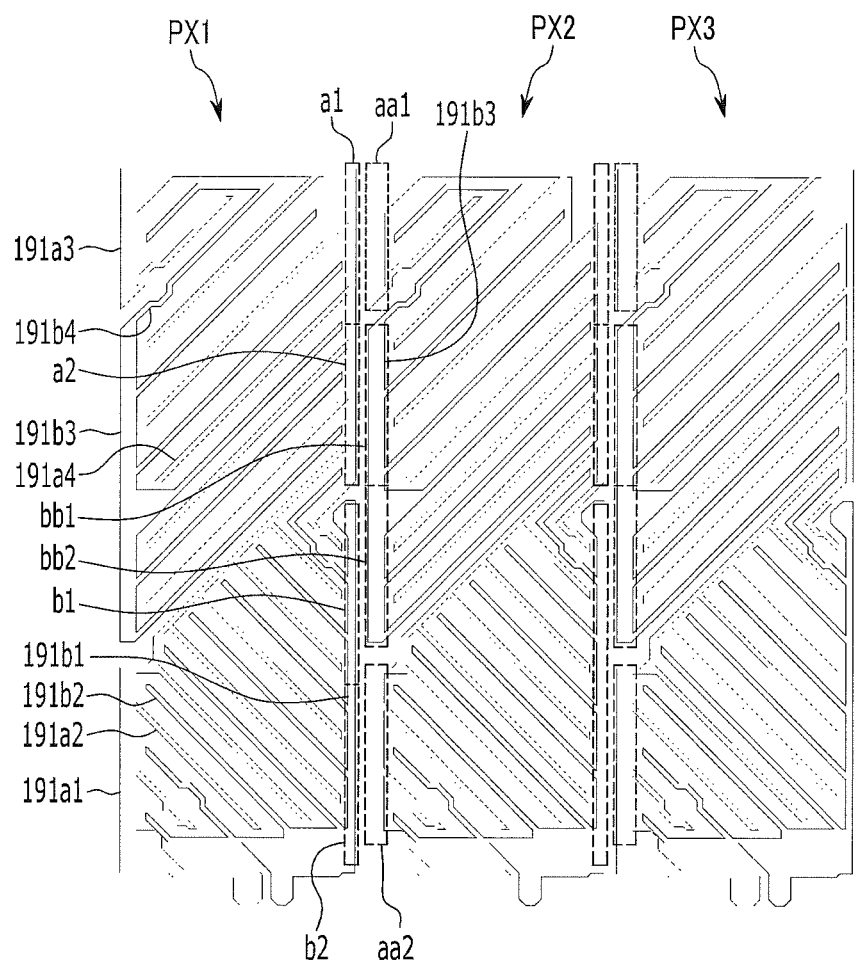
FIG. 8 is a plan view of an exemplary embodiment of a pixel electrode of the liquid crystal display of FIG. 6.

Referring to FIG. 6 and FIG. 7, an exemplary embodiment of a liquid crystal panel assembly according to the invention includes a lower panel 100 and an upper panel 200 facing each other, and a liquid crystal layer 3 interposed between the two display panels 100 and 200.

Firstly, the lower panel 100 will be described.

A plurality of gate conductors including a plurality of gate lines 121, a plurality of storage electrode lines 131, and first to third connection conductors 135a, 135b, and 135c are directly on an insulation substrate 110.

The gate lines 121 transmitting gate signals extend in a transverse direction, and each gate line 121 includes a plurality of pairs of a first gate electrode 124a and a second gate electrode 124b protruding upward in the plan view.

The storage electrode lines 131 are applied with a predetermined voltage and mainly extend in the transverse direction. Each storage electrode line 131 is positioned between two neighboring gate lines 121 and is closer to the lower gate line 121 of the two neighboring gate lines in the plan view. Each storage electrode line 131 includes a plurality of pairs of first storage electrodes 133a and second storage electrodes 133b protruding upward. The connection conductors 135a, 135b, and 135c are disposed at the edge and the center of the pixel area.

The gate conductor may have a single layer or a multilayer structure.

A gate insulating layer 140 including silicon nitride (SiNx) or silicon oxide (SiOx) is directly on the gate conductor.

A plurality of pairs of a first semiconductor 154a and a second semiconductor 154b including hydrogenated amorphous silicon or polysilicon are directly on the gate insulating layer 140. The first semiconductor 154a and the second semiconductor 154b are respectively positioned on the first gate electrode 124a and the second gate electrode 124b.

A pair of ohmic contacts (not shown) are on each of the first semiconductors 154a, and a pair of ohmic contacts 163b and 165b are on each the second semiconductors 154b. The ohmic contacts may include a material such as n+ hydrogenated amorphous silicon, which is highly doped with an n-type impurity such as phosphorous (P), or of silicide. In another exemplary embodiment of a liquid crystal display according to the invention, the ohmic contacts may be omitted, and in detail, when the first semiconductor 154a and the second semiconductor 154b include an oxide semiconductor, the ohmic contacts may be omitted.

A data conductor including a plurality of data lines 171, 171a, 171b, and 171c and voltage transmitting lines 172, and a plurality of pairs of a first drain electrode 175a and a second drain electrode 175b, are directly on the ohmic contacts 163b and 165b and the gate insulating layer 140.

The data lines 171a, 171b, and 171c transmitting data signals mainly extend in a longitudinal direction and intersect the gate lines 121 and the storage electrode lines 131. The voltage transmitting lines 172 transmit a voltage of a constant magnitude and extend parallel to the data lines 171a, 171b, and 171c thereby intersecting the gate lines 121 and the storage electrode lines 131.

The voltage transmitting lines 172 include a first source electrode 173a in the first pixel PX1 that is curved with a U shape toward the first gate electrode 124a. The first source electrode 173a includes an expanded portion 173c.

Each of the data lines 171a, 171b, and 171c include a second source electrode 173b that is curved with a U shape toward the second gate electrode 124b.

The voltage transmitted by the first voltage transmitting line 172 may have a constant magnitude, and the polarity thereof may be changed per frame. The first source electrode 173a of the second pixel PX2 and the third pixel PX3 is connected to the first source electrode 173a of the first pixel PX1 extended from the voltage transmitting line 172 through a connection member 196, thereby receiving the same signal. The connection member 196 is connected to each of expansion portions 173c of the first source electrodes 173a in first, second and third pixels PX1, PX2 and PX3, via contact hole 188 which extends through the thickness of the passivation layer 180. The voltage transmitting line 172 transmits the voltage to the three pixels PX1, PX2 and PX3.

The first drain electrode 175a and the second drain electrode 175b include a distal first end having a narrow bar shape and a second opposing end having a relatively wide area. The distal bar first ends of the first drain electrode 175a and the second drain electrode 175b are opposite to the first source electrode 173a and the second source electrode 173b with respect to the first gate electrode 124a and the second gate electrode 124b, and are partially enclosed by the curved first source electrode 173a and second source electrode 173b. The respective wide ends are electrically connected to a first pixel electrode 191a and a second pixel electrode 191b through a first contact hole 185a and a second contact hole 185b that will be described later.

The first gate electrode 124a, the first source electrode 173a and the first drain electrode 175a form a first thin film transistor ("TFT") along with the first semiconductor 154a, and the channel of the first TFT is on the first semiconductor 154a between the first source electrode 173a and the first drain electrode 175a.

The second gate electrode 124b, the second source electrode 173b and the second drain electrode 175b form a second TFT along with the second semiconductor 154b, and the channel of the second TFT is on the second semiconductor 154b between the second source electrode 173b and the second drain electrode 175b.

The data conductors 171, 172, 175a, and 175b may have a single layer or multilayer structure.

The ohmic contacts are interposed only between the underlying semiconductors 154a and 154b and the overlying data conductors 171, 172, 175a, and 175b respectively thereon, and reduce contact resistance therebetween. Portions of the semiconductors 154a and 154b are exposed and are not covered by the data conductors 171, 172, 175a, and 175b, and are also disposed between the source electrodes 173a and 173b and the drain electrodes 175a and 175b.

A passivation layer 180 including an inorganic insulator or organic insulator is directly on the data conductors 171, 172, 175a, and 175b and the exposed portions of the semiconductors 154a and 154b.

The passivation layer 180 includes a plurality of the first and second contact holes 185a and 185b extended through a thickness thereof, at the wide ends of the first drain electrode 175a and the second drain electrode 175b. The passivation layer 180 and the gate insulating layer 140 include a plurality of contact holes 186a, 186b, 187a, and 187b extended through thicknesses thereof and exposing portions of the first to third connection conductors 135a, 135b, and 135c.

A plurality of pixel electrodes 191 including a transparent conductive material such as indium tin oxide ("ITO") or indium zinc oxide ("IZO") and/or a reflective metal such as aluminum, silver, chromium, or alloys thereof and including a plurality of pairs of the first and second pixel electrodes 191a and 191b, are directly on the passivation layer 180.

As shown in FIG. 6, the entire outer shape of one pixel electrode 191 is a quadrangle in the plan view, and the first pixel electrode 191a and the second pixel electrode 191b are engaged with each other, e.g., portions thereof alternate within the pixel. The first pixel electrode 191a and the second pixel electrode 191b are substantially vertically symmetrical with respect to an imaginary transverse central line, and are respectively divided into two sub-regions, e.g., an upper sub-region and a lower sub-region in the plan view.

The first pixel electrode 191a includes a lower stem 191a1 and an upper stem 191a3, and a plurality of first branches 191a2 and a plurality of second branches 191a4 extending from the lower stem 191a1 and the upper stem 191a3, while the second pixel electrode 191b includes a lower stem 191b1 and an upper stem 191b3, and a plurality of the third branches 191b2 and a plurality of fourth branches 191b4 extending from the lower stem 191b1 and the upper stem 191b3.

The lower stem 191a1 and the upper stem 191a3 of the first pixel electrode 191a are disposed substantially on the left side and the right side of one pixel electrode, and the lower stem 191b1 and the upper stem 191b3 of the second pixel electrode 191b are disposed substantially on the right side and the left side of one pixel electrode 191. The upper stem 191a3 may be extended to the left side of the pixel electrode, from the right side.

The angle of the plurality of branches 191a2, 191a4, 191b2, and 191b4 of the first pixel electrode 191a and the second pixel electrode 191b with respect to the transverse center line may be about 45 degrees.

The branches of the first pixel electrode 191a and the second pixel electrode 191b engage with each other with a predetermined interval therebetween and are alternately disposed, thereby forming a pectinated pattern. The interval between the branches 191a2, 191a4, 191b2 and 191b4 of the first pixel electrode 191a and the second pixel electrode 191b is preferably about 30 micrometers (μm). The interval is taken perpendicular to a longitudinal extension direction of the branches.

The branches of the first pixel electrode 191a and the second pixel electrode 191b engage with each other and are alternately disposed, thereby forming a pectinated pattern. A low gray region in which the interval between the neighboring branches is relatively large or wide and a high gray region in which the interval between the neighboring branches is relatively small or narrow exist. In the plan view, the high gray region is disposed substantially at the center of the pixel area and is enclosed by the low gray region. In detail, in the case of the low gray region in which the interval between the branches of the first pixel electrode 191a and the branches of the second pixel electrode 191b that are alternately disposed is wide, the intensity of the electric field applied to the liquid crystal layer 3 between the branches of the first pixel electrode 191a and the branches of the second pixel electrode 191b is decreased such that a relative low gray is displayed although the same voltage is applied compared with the high gray region in which the interval between the neighboring branches is narrow. Similarly, in the case of the high gray region in which the interval between the branches of the first pixel electrode 191a and the branches of the second pixel electrode 191b that are alternately disposed is narrow, the intensity of the electric field applied to the liquid crystal layer 3 between the branches of the first pixel electrode 191a and the branches of the second pixel electrode 191b is increased such that a relative high gray is displayed although the same voltage is applied compared with the low gray region in which the interval between the neighboring branches is wide. It is possible to vary the inclination angle of the liquid crystal molecules 31 of the liquid crystal layer 3 and display different luminance with respect to one image information set by varying the interval between the first pixel electrode 191a and the second pixel electrode 191b in one pixel. Further, it is possible to maximally make an image viewed from a side of the liquid crystal display closer to an image viewed from a front of the liquid crystal display by properly adjusting the interval between the branches of the first pixel electrode 191a and the second pixel electrode 191b. Therefore, it is possible to improve side visibility of the liquid crystal display and enhance transmittance.

In the exemplary embodiment of the liquid crystal display according to the invention, a ratio of the low gray region and the high gray region may be in a range of about 4:1 to about 30:1. Also, the interval between the branches of the first pixel electrode 191a and the second pixel electrode 191b may be about 10 μm to about 17 μm in the low gray region, and the interval between the branches of the first pixel electrode 191a and the second pixel electrode 191b may be about 3 μm to about 7 μm in the high gray region.

The low gray region is disposed in a portion of the pixel PX that is not enclosed by the stems 191a1, 191a3, 191b1, and 191b3 of the first pixel electrode 191a and the second pixel electrode 191b among the pixel outer portion of the exemplary embodiment of the liquid crystal display according to the invention such that the region where the magnitude of the horizontal electric field between the first pixel electrode 191a and the second pixel electrode 191b is relatively weak is disposed. Accordingly, a display quality deterioration that can be generated by the asymmetry of the direction of the horizontal electric field between the first pixel electrode 191a and the second pixel electrode 191b such as texture may be reduced.

Also, the exemplary embodiment of the liquid crystal display according to the invention may have an extension region in which the intervals between the branches 191a2 and 191a4 of the first pixel electrode 191a and the branches 191b2 and 191b4 of the second pixel electrode 191b are extended. The intervals between the branches 191a2 and 191a4 of the first pixel electrode 191a and the branches 191b2 and 191b4 of the second pixel electrode 191b in the extension region may be about 20 μm to about 28 μm. It is preferable that the extension region is disposed at the position where the liquid crystal molecules are irregularly moved in the pixel area such as a portion near the portion that is not enclosed by the stems 191a1, 191a3, 191b1, and 191b3 of the first pixel electrode 191a and the second pixel electrode 191b among the pixel outer part of the liquid crystal display or the gate line 121.

By this, the liquid crystal molecules 31 disposed at the extension region are relatively weak with regard to the influence of the horizontal electric field that is formed between the branches 191a2 and 191a4 of the first pixel electrode 191a and the branches 191b2 and 191b4 of the second pixel electrode 191b. Accordingly, the liquid crystal molecules 31 disposed at the extension region are less influenced by the asymmetrical horizontal electric field, and the liquid crystal molecules 31 have a large tendency to maintain the vertical alignment state that is the initial alignment state such that the liquid crystal molecules being irregularly slanted by external pressure may be reduced or effectively prevented. Accordingly, irregular movement of the liquid crystal molecules being diffused from the outer part of the pixel area to the inner part of the pixel area is reduced or effectively prevented, and a singular point limited in the extension region is prevented from being formed such that the quality deterioration of a large-sized display that flows from the outer part of the pixel area to the inner part of the pixel area may be reduced or effectively prevented.

However, the shape of the first pixel electrode 191a and the second pixel electrode 191b in the exemplary embodiment of one pixel of the liquid crystal display according to the invention is not limited thereto, and all shapes of which at least portions of the first pixel electrode 191a and the second pixel electrode 191b are formed the same and are alternately disposed may be applied.

The first pixel electrode 191a of the first pixel PX1 is physically and electrically connected to the first pixel PX1 first drain electrode 175a through the contact hole 185a, thereby receiving the voltage transmitted through the voltage transmitting line 172 from the first drain electrode 175a. Also, the second pixel electrode 191b of the first pixel PX1 is physical and electrically connected to the first pixel PX1 second drain electrode 175b through the contact hole 185b, thereby receiving the first data voltage flowing in the first data line 171a. The first pixel electrode 191a and the second pixel electrode 191b form the liquid crystal capacitor Clc along with the liquid crystal layer 3 interposed therebetween to maintain the applied voltage after the first TFT and the second TFT are turned off.

The first pixel electrode 191a of the second pixel PX2 is connected to the second pixel PX2 first drain electrode 175a through the first contact hole 185a thereby receiving the voltage transmitted through the voltage transmitting line 172, and the second pixel electrode 191b of the second pixel PX2 is connected to the second pixel PX2 second drain electrode 175b through the second contact hole 185b thereby receiving the data voltage flowing in the second data line 171b.

The first pixel electrode 191a of the third pixel PX3 is electrically connected to the third pixel PX3 first drain electrode 175a through the contact hole 185a thereby receiving the voltage flowing in the voltage transmitting line 172 from the first drain electrode 175a, and the second pixel electrode 191b of the third pixel PX3 is electrically connected to the third pixel PX3 second drain electrode 175b through the contact hole 185b thereby receiving the third data voltage flowing in the third data line 171c.

The voltage transmitting line 172 is connected to the first drain electrode 175a of the second pixel PX2 and the third pixel PX3 by the connection member 196. The connection member 196 may be in the same layer as the pixel electrode 191.

The wide ends of the first drain electrode 175a and the second drain electrode 175b connected to the first pixel electrode 191a and the second pixel electrode 191b overlap the storage electrodes 133a and 133b with the gate insulating layer 140 interposed therebetween to form a storage capacitor, thereby the storage capacitor enforces the voltage maintaining capacity of the liquid crystal capacitor Clc.

In the first pixel PX1, the first stem 191a1 of the first pixel electrode 191a is connected to the first connection conductor 135a through the contact hole 186a, and the second stem 191a3 of the first pixel electrode 191a is connected to the third connection conductor 135c through the contact hole 187b, thereby receiving the data voltage from the first drain electrode 175a.

In the first pixel PX1, the first stem 191b1 of the second pixel electrode 191b is connected to the second connection conductor 135b through the contact hole 187a, and the second stem 191b3 of the second pixel electrode 191b is connected to the second connection conductor 135b through the contact hole 186b, thereby receiving the data voltage from the first drain electrode 175a. Similarly, the stems 191a1, 191a3, 191b1, and 191b3 of the second pixel PX2 and the third pixel PX3 also receive the voltage through a connection conductor.

A lower alignment layer (not shown) may be on an inner surface of the lower panel 100, and the lower alignment layer may be a vertical alignment layer. Although not shown, a polymer layer may be on the lower alignment layer, and the polymer layer may include a polymer branch that is formed according to an initial alignment direction of the liquid crystal molecules 31. The polymer layer may be formed by exposing and polymerizing a prepolymer that is hardened by polymerization with light like ultraviolet rays such as a monomer, and the alignment force of the liquid crystal molecules may be controlled according to the polymer branch.

Referring to FIG. 8, in the exemplary embodiment of the liquid crystal display according to the invention, a corresponding planar area of the upper stem 191a3 as aa1 of the first pixel electrode 191a disposed in the second pixel PX2, facing the upper stem 191a3 as a1 and a2 of the first pixel electrode 191a disposed in the first pixel PX1 with respect to the first data line 171a, is almost the same as the corresponding planar area of the upper stem 191b3 as bb1 of the second pixel electrode 191b.

Also, a corresponding planar area of the lower stem 191a1 as aa2 of the first pixel electrode 191a disposed in the second pixel PX2, facing the lower stem 191b1 as b1, and b2 of the second pixel electrode 191b disposed in the first pixel PX1 with respect to the first data line 171a, is almost the same as the corresponding planar area of the upper stem 191b3 as bb2 of the second pixel electrode 191b.

Similarly, the corresponding planar area of the upper stem 191a3 as a1 of the first pixel electrode 191a disposed in the first pixel PX1, facing the upper stem 191a3 as aa1 of the first pixel electrode 191a disposed in the second pixel PX2 with respect to the first data line 171a, is almost the same as the corresponding planar area of the lower stem 191b1 as b2 of the second pixel electrode 191b disposed in the first pixel PX1, facing the lower stem 191a1 as aa2 of the first pixel electrode 191a disposed in the second pixel PX2, with respect to the first data line 171a.

Also, the corresponding area of the upper stem 191a3 as a2 of the first pixel electrode 191a disposed in the first pixel PX1, is almost the same as the corresponding planar area of the lower stem 191b1 as b1 of the second pixel electrode 191b disposed in the first pixel PX1, facing the upper stem 191b3 as bb1, and bb2 of the second pixel electrode 191b disposed in the second pixel PX2, with respect to the first data line 171a.

The case of the second pixel PX2 and the third pixel PX3 facing each other with respect to the second data line 171b is similar.

Also, the overlapping planar areas of the voltage transmitting line 172 or the data line 171 disposed at both sides with respect to one pixel electrode and the pixel electrode are almost the same.

Next, the upper panel 200 will be described.

Referring again to FIG. 7, a light blocking member 220 is directly on an insulation substrate 210 including transparent glass or plastic. The light blocking member 220 reduces or effectively prevents light leakage between the pixel electrodes 191 and includes an opening region that faces the pixel electrodes 191.

A plurality of color filters 230 are directly on the substrate 210 and the light blocking member 220. The color filters 230 mostly exist within the area surrounded by the light blocking member 220 in the plan view, and may longitudinally extend along the columns of the pixel electrodes 191 in the longitudinal direction. The respective color filters 230 may express one of three primary colors of red, green, and blue, or primary colors of yellow, cyan, and magenta, or a plurality of colors. Also, each pixel may represent a mixture of the primary colors or white as well as the primary colors.

An overcoat 250 is directly on the color filters 230 and the light blocking member 220. The overcoat 250 may include an inorganic or organic insulator, and reduces or effectively prevents exposure of the color filters 230 and provides a planarized surface. The overcoat 250 may be omitted.

An upper alignment layer (not shown) is coated on the inner surface of the upper panel 200, and the upper alignment layer may be a vertical alignment layer. Although not shown, a polymer layer may also be on the upper alignment layer. The polymer layer may be formed by exposing a prepolymer that is hardened by polymerization with light like ultraviolet rays such as a monomer, such that the alignment force of the liquid crystal molecules may be controlled. The polymer layer may include a polymer branch that is formed according to the initial alignment direction of the liquid crystal molecules.

At least one polarizer (not shown) may be provided on the outer surface of the display panels 100 and 200.

The liquid crystal layer 3 that is disposed between the lower display panel 100 and the upper display panel 200 includes liquid crystal molecules 31 that have positive dielectric anisotropicity, and the liquid crystal molecules 31 may be aligned so that long axes thereof are perpendicular to the surfaces of two display panels 100 and 200 in a state in which there is no electric field.

If the first pixel electrode 191a and the second pixel electrode 191b are applied with different voltages, an electric field that is almost parallel to the surfaces of the display panels 100 and 200 is generated. Thus, the liquid crystal molecules of the liquid crystal layer 3 that are initially aligned perpendicular to the surfaces of the display panels 100 and 200 are rearranged in response to the electric field such that the long axes thereof are declined parallel to the direction of the electric field, and the change degree of the polarization of the light incident to the liquid crystal layer 3 is different according to the declination degree of the liquid crystal molecules. The change of the polarization appears as a change of the transmittance by the polarizer, and thereby the liquid crystal display displays images.

As described above, the liquid crystal molecules 31 that are vertically aligned are used such that the contrast ratio of the liquid crystal display may be improved and the wide viewing angle may be realized. Furthermore, when the liquid crystal molecules 31 that are aligned perpendicular to the display panel 100 and 200 are used, the contrast ratio of the liquid crystal display may be improved and the wide viewing angle may be realized. In addition, the liquid crystal molecules 31 that have positive dielectric anisotropicity have greater dielectric anisotropicity and a lower rotation viscosity as compared to the liquid crystal molecules 31 that have negative dielectric anisotropicity, so it is possible to obtain a rapid response speed.

Also, in the exemplary embodiment of the liquid crystal display according to the invention, the branches of the first pixel electrode 191a and the second pixel electrode 191b engage with each other and are alternately disposed, thereby forming a pectinated pattern. A low gray region is formed where the interval between the neighboring branches is wide and a high gray region is formed where the interval between the neighboring branches is narrow, and the high gray region is disposed at the center of the pixel area and is enclosed by the low gray region. It is possible to vary the inclination angle of the liquid crystal molecules 31 of the liquid crystal layer 3 and display different luminance with respect to one image information set by varying the interval between the first pixel electrode 191a and the second pixel electrode 191b in one pixel. Further, it is possible to maximally make an image viewed from the side of the liquid crystal display closer to an image viewed from the front of the liquid crystal display by properly adjusting the interval between the branches of the first pixel electrode 191a and the second pixel electrode 191b. Therefore, it is possible to improve side visibility of the liquid crystal display and enhance transmittance.

The low gray region is disposed in a portion of the pixel PX that is not enclosed by the stems 191a1, 191a3, 191b1, and 191b3 of the first pixel electrode 191a and the second pixel electrode 191b among the pixel outer portion of the exemplary embodiment of the liquid crystal display according to the invention such that the region where the magnitude of the horizontal electric field between the first pixel electrode 191a and the second pixel electrode 191b is relatively weak is disposed. Accordingly, the display quality deterioration that can be generated by the asymmetry of the direction of the horizontal electric field between the first pixel electrode 191a and the second pixel electrode 191b such as texture may be reduced.

The exemplary embodiment of the liquid crystal display according to the invention has the extension region where the interval between the branches 191a2 and 191a4 of the first pixel electrode 191a and the branches 191b2 and 191b4 of the second pixel electrode 191b is extended. The interval between the branches 191a2 and 191a4 of the first pixel electrode 191a and the branches 191b2 and 191b4 of the second pixel electrode 191b in the extension region may be about 20 µm to about 28 µm. It is preferable that the extension region is disposed at the position where the liquid crystal molecules are irregularly moved in the pixel area such as a portion near the portion that is not enclosed by the stems 191a1, 191a3, 191b1, and 191b3 of the first pixel electrode 191a and the second pixel electrode 191b among the pixel outer part of the liquid crystal display, or near the gate line 121.

By this, the liquid crystal molecules 31 disposed at the extension region are relatively weak with regard to the influence of the horizontal electric field that is formed between the branches 191a2 and 191a4 of the first pixel electrode 191a and the branches 191b2 and 191b4 of the second pixel electrode 191b. Accordingly, the liquid crystal molecules 31 disposed at the extension region are less influenced by the asymmetrical horizontal electric field, and the liquid crystal molecules 31 have a large tendency to maintain the vertical alignment state that is the initial alignment state such that the liquid crystal molecules being irregularly slanted by external pressure may be reduced or effectively prevented. Accordingly, the irregular movement of the liquid crystal molecules being diffused from the outer part of the pixel area to the inner of the pixel area is reduced or effectively prevented, and forming of the singular point limited in the extension region is reduced or effectively prevented such that the large-sized display quality deterioration that flows from the outer part of the pixel area to the inner part of the pixel area may be reduced or effectively prevented.

In the case of the exemplary embodiment of the liquid crystal display according to the invention, the voltage transmitting line 172 is covered (e.g., overlapped) by the stem of the pixel electrode.

Also, in the case of the exemplary embodiment of the liquid crystal display according to the invention, the corresponding planar area of the first pixel electrode 191a and the corresponding area of the second pixel electrode 191b in the neighboring pixels facing each other with respect to the first pixel electrode 191a of one pixel and the data line are the same, and the corresponding planar area of the first pixel electrode 191a and the corresponding area of the second pixel electrode 191b in the neighboring pixels facing each other with respect to the second pixel electrode 191b of one pixel and the data line are the same.

In one exemplary embodiment, for example, the corresponding lengths of the stems of the first pixel electrode 191a and the second pixel electrode 191b of the first pixel PX1 and the second pixel PX2 facing each other with respect to the first data line 171a are substantially symmetrical. In detail, the corresponding planar area of the upper stem 191a3 of the first pixel electrode 191a disposed in the second pixel PX2 (as aa1), and the corresponding planar area of the upper stem 191b3 of the second pixel electrode 191b (as bb1) of the second pixel electrode 191b, both facing the upper stem 191a3 of the first pixel electrode 191a disposed in the first pixel PX1 (as a1 and a2) with respect to the first data line 171a, are almost the same.

Also, the corresponding planar area of the lower stem 191a1 of the first pixel electrode 191a (as aa2) facing the lower stem 191b1 (as b1 and b2) of the second pixel electrode 191b disposed in the first pixel PX1 with respect to the first data line 171a, is almost the same as the corresponding planar area of the upper stem 191b3 of the second pixel electrode 191b (as bb2).

Similarly, the corresponding planar area of the upper stem 191a3 of the first pixel electrode 191a (as a1) disposed in the first pixel PX1, facing the upper stem 191a3 of the first pixel electrode 191a (as aa1) disposed in the second pixel PX2 with respect to the first data line 171a, is almost the same as the corresponding planar area of the lower stem 191b1 of the second pixel electrode 191b disposed in the first pixel PX1 (as b2), facing the lower stem 191a1 of the first pixel electrode 191a disposed in the second pixel PX2 (as aa2) with respect to the first data line 171a.

Also, the corresponding planar area of the upper stem 191a3 of the first pixel electrode 191a disposed in the first pixel PX1 (labeled as a2) and the corresponding planar area of the lower stem 191b1 (labeled as b1) of the second pixel electrode 191b facing the upper stem 191b3 of the second pixel electrode 191b (labeled as bb2) disposed in the second pixel PX2 with respect to the first data line 171a, are almost the same.

Also, the overlapping areas of the voltage transmitting line 172 or the data line 171 disposed at both of opposing sides of one pixel electrode, and the pixel electrode are almost the same.

In this way, the voltage transmitting line 172 transmitting the voltage of the predetermined magnitude is covered by the pixel electrodes 191a and 191b such that the electric field formed between the voltage transmitting line 172 and the pixel electrodes 191a and 191b is blocked, and thereby the voltage distortion of the pixel electrodes 191a and 191b and the signal delay of the voltage transmitted by the voltage transmitting line 172 may be reduced or effectively prevented. Also, capacitance formed by the overlapping of the pixel electrode 191a and 191b and the voltage transmitting line 172 functions as the storage capacitor such that the storage capacitance of the liquid crystal display may be increased.

Also, the corresponding area of the first pixel electrode 191a and the corresponding area of the second pixel electrode 191b of the neighboring pixels facing each other with respect to the first pixel electrode 191a of one pixel and the data line are almost the same, and the corresponding area of the first pixel electrode 191a and the corresponding area of the second pixel electrode 191b of the neighboring pixels facing each other with respect to the second pixel electrode 191b of one pixel and the data line are almost the same such that the voltage change of the first pixel electrode 191a and the second pixel electrode 191b according to the change of the voltage applied to the pixel electrode 191 of the neighboring pixels are the same, as is the intensity of the electric field charged to the liquid crystal capacitor, and thereby the crosstalk by the coupling between the pixel electrodes of the neighboring pixels may be reduced.

Also, the overlapping areas of the voltage transmitting line 172 or the data line 171 disposed at both of opposing sides of one pixel electrode, and the pixel electrode, are almost the same, thereby the crosstalk by the coupling between the pixel electrode and two neighboring data lines may be reduced.

The above-described exemplary embodiments of the arrangements of signal lines and pixels and the driving methods thereof of the liquid crystal displays according to the invention may be applied to a pixel of all shapes including a first pixel electrode and a second pixel electrode of which at least portions are formed in the same layer and are alternately disposed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A liquid crystal display comprising:
a first substrate and a second substrate which face each other;
a liquid crystal layer between the first and second substrates and including liquid crystal molecules;
a gate line which is on the first substrate and transmits a gate signal;
a plurality of data lines which is on the first substrate and transmits a first voltage;
a voltage transmitting line which is on the first substrate and transmits a second voltage maintained at a predetermined level for a frame; and
a plurality of pixels on the first substrate, each pixel including a first pixel electrode, and a second pixel electrode different from the first pixel electrode and separated from the first pixel electrode,
wherein
the plurality of pixels includes a first pixel, and a second pixel adjacent to the first pixel, with respect to a first data line between the first and second pixels,
one of the first pixel electrode and the second pixel electrode receives the first voltage through one data line, and the other of the first pixel electrode and the second pixel electrode receives the second voltage through the voltage transmitting line,
the first pixel electrode and the second pixel electrode each include stems at pixel peripheral edges adjacent to the voltage transmitting line and the first data line, and a plurality of branch electrodes which extend from the stems, respectively, wherein branch electrodes of the first pixel electrode and branch electrodes of the second pixel electrode alternate,
a stem of the first pixel electrode of the first pixel, faces a stem of the first pixel electrode of the second pixel and a stem of the second pixel electrode of the second pixel, with respect to the first data line between the first and second pixels, and an area of the stem of the first pixel electrode of the second pixel which faces the stem of the first pixel electrode of the first pixel, and an area of the stem of the second pixel electrode of the second pixel which faces the stem of the first pixel electrode of the first pixel, are substantially the same.

2. The liquid crystal display of claim 1, wherein
the stem of the second pixel electrode of the first pixel, faces the stem of the first pixel electrode of the second pixel and the stem of the second pixel electrode of the second pixel, with respect to the first data line between the first and second pixels, and an area of the stem of the first pixel electrode of the second pixel which faces the stem of the second pixel electrode of the first pixel, and an area of the stem of the second pixel electrode of the second pixel which faces the stem of the second pixel electrode of the first pixel, are substantially the same.

3. The liquid crystal display of claim 2, wherein
the voltage transmitting line is connected to three pixels of the plurality of pixels.

4. The liquid crystal display of claim 3, wherein
the stems of the first pixel electrode and the second pixel electrode overlap at least ⅔ of an area of the voltage transmitting line.

5. The liquid crystal display of claim 4, wherein
a first interval between the branches of the first pixel electrode and the branches of the second pixel electrode is larger than a second interval between the branches of the first pixel electrode and the branches of the second pixel electrode, a first region includes the first interval between the branches of the first pixel electrode and the branches of the second pixel electrode, and a second region includes the second interval between the branches of the first pixel electrode and the branches of the second pixel electrode, and the first region is at the peripheral edge of the pixel which excludes the stems of the first pixel electrode and the second pixel electrode.

6. The liquid crystal display of claim 5, wherein
the liquid crystal layer vertically aligns in the absence of an electric field in the liquid crystal layer.

7. The liquid crystal display of claim 6, wherein
the first region further includes an extension including a third interval between the branches of the first pixel electrode and the branches of the second pixel electrode larger than the first interval.

8. The liquid crystal display of claim 1, wherein
the voltage transmitting line is connected to three pixels of the plurality of pixels.

9. The liquid crystal display of claim 8, wherein
the stems of the first pixel electrode and the second pixel electrode overlap at least ⅔ of an area of the voltage transmitting line.

10. The liquid crystal display of claim 9, wherein
a first interval between the branches of the first pixel electrode and the branches of the second pixel electrode is larger than a second interval between the branches of the first pixel electrode and the branches of the second pixel electrode, a first region includes the first interval between the branches of the first pixel electrode and the branches of the second pixel electrode, and a second region includes the second interval between the branches of the first pixel electrode and the branches of the second pixel electrode, and the first region is at the peripheral edge of the pixel which excludes the stems of the first pixel electrode and the second pixel electrode.

11. The liquid crystal display of claim 10, wherein
the liquid crystal layer vertically aligns in the absence of an electric field in the liquid crystal layer.

12. The liquid crystal display of claim 11, wherein
the first region further includes an extension including a third interval between the branches of the first pixel electrode and the branches of the second pixel electrode larger than the first interval.

13. The liquid crystal display of claim 1, wherein
the stems of the first pixel electrode and the second pixel electrode overlap at least ⅔ of an area of the voltage transmitting line.

14. The liquid crystal display of claim 13, wherein
a first interval between the branches of the first pixel electrode and the branches of the second pixel electrode is larger than a second interval between the branches of the first pixel electrode and the branches of the second pixel electrode, a first region includes the first interval between the branches of the first pixel electrode and the branches of the second pixel electrode, and a second region includes the second interval between the branches of the first pixel electrode and the branches of the second pixel electrode, and the first region is at the peripheral edge of the pixel which excludes the stems of the first pixel electrode and the second pixel electrode.

15. The liquid crystal display of claim 14, wherein
the liquid crystal layer vertically aligns in the absence of an electric field in the liquid crystal layer.

16. The liquid crystal display of claim 15, wherein
the first region further includes an extension including a third interval between the branches of the first pixel electrode and the branches of the second pixel electrode larger than the first interval.

17. The liquid crystal display of claim 1, wherein
a first interval between the branches of the first pixel electrode and the branches of the second pixel electrode is larger than a second interval between the branches of the first pixel electrode and the branches of the second pixel electrode, a first region includes the first interval between the branches of the first pixel electrode and the branches of the second pixel electrode, and a second region includes the second interval between the branches of the first pixel electrode and the branches of the second pixel electrode, and the first region is at the peripheral edge of the pixel which excludes the stems of the first pixel electrode and the second pixel electrode.

18. The liquid crystal display of claim 17, wherein
the liquid crystal layer vertically aligns in the absence of an electric field in the liquid crystal layer.

19. The liquid crystal display of claim 18, wherein
the first region includes an extension including a third interval between the branches of the first pixel electrode and the branches of the second pixel electrode larger than the first interval.

20. The liquid crystal display of claim 1, wherein
the liquid crystal layer vertically aligns in the absence of an electric field in the liquid crystal layer.

21. The liquid crystal display of claim 20, wherein
a first interval between the branches of the first pixel electrode and the branches of the second pixel electrode is larger than a second interval between the branches of the first pixel electrode and the branches of the second pixel electrode, a first region includes the first interval between the branches of the first pixel electrode and the branches of the second pixel electrode and a second region includes the second interval between the branches of the first pixel electrode and the branches of the second pixel electrode, and the first region is at the peripheral edge of the pixel which excludes the stems of the first pixel electrode and the second pixel electrode.

22. The liquid crystal display of claim 21, wherein the first region further includes an extension including a third interval between the branches of the first pixel electrode and the branches of the second pixel electrode larger than the first interval.

* * * * *